(12) United States Patent
Yamauchi

(10) Patent No.: US 9,091,875 B2
(45) Date of Patent: Jul. 28, 2015

(54) SCREEN AND IMAGE DISPLAY SYSTEM

(75) Inventor: Taisuke Yamauchi, Matsumoto (JP)

(73) Assignee: Seiko Epson Corporation (JP)

( * ) Notice: Subject to any disclaimer, the term of this patent is extended or adjusted under 35 U.S.C. 154(b) by 374 days.

(21) Appl. No.: 13/613,973

(22) Filed: Sep. 13, 2012

(65) Prior Publication Data

US 2013/0088665 A1 Apr. 11, 2013

(30) Foreign Application Priority Data

Oct. 7, 2011 (JP) ................... 2011-222914

(51) Int. Cl.
  *G02F 1/1333* (2006.01)
  *G02F 1/1334* (2006.01)
  *G02F 1/139* (2006.01)
  *G02F 1/137* (2006.01)

(52) U.S. Cl.
  CPC ............ *G02F 1/1334* (2013.01); *G02F 1/1397* (2013.01); *G02F 2001/13347* (2013.01); *G02F 2001/13775* (2013.01)

(58) Field of Classification Search
  None
  See application file for complete search history.

(56) References Cited

U.S. PATENT DOCUMENTS

| 5,872,607 A | 2/1999 | Yazaki et al. |
| 7,336,289 B2 | 2/2008 | Ishikawa et al. |
| 2009/0167966 A1* | 7/2009 | Nam et al. ........................ 349/5 |

FOREIGN PATENT DOCUMENTS

| JP | 07-036022 | 2/1995 |
| JP | 11-249110 | 9/1999 |
| JP | 2005-010481 A | 1/2005 |
| WO | WO-96-20425 A1 | 7/1996 |
| WO | 2004-021079 | 3/2004 |

* cited by examiner

*Primary Examiner* — Richard Kim
(74) *Attorney, Agent, or Firm* — Harness, Dickey & Pierce, P.L.C.

(57) ABSTRACT

A screen includes a polymer-dispersed liquid crystal layer including liquid crystal molecules, and polymer molecules different from the liquid crystal molecules, a twist angle of the polymer molecules is equal to or larger than 180°, and the polymer-dispersed liquid crystal layer comes into a first state of transmitting light entering the polymer-dispersed liquid crystal layer in a period in which an electric field fails to act on the polymer-dispersed liquid crystal layer, and comes into a second state of scattering the light entering the polymer-dispersed liquid crystal layer in a period in which the electric field acts on the polymer-dispersed liquid crystal layer.

18 Claims, 10 Drawing Sheets ized that the display element is low, or the view angle thereof is narrow. Since such a problem arises, the display characteristics of the screen are degraded.

SCREEN AND IMAGE DISPLAY SYSTEM

BACKGROUND

1. Technical Field

The present invention relates to a screen and an image display system.

2. Related Art

In recent years, as a screen for displaying an image, those using polymer-dispersed liquid crystal (PDLC) having a liquid crystal dispersed in a polymer have attracted attention (e.g., International Patent Publication WO 2004/21079 (Document 1)). Such a display element uses the difference in refractive index between the liquid crystal and the polymer, and comes into a transmissive (transparent) state in an electric field non-application condition, or comes into a scattering state due to electric field application, for example. Further, by projecting picture light to the display element set to the scattering state, a desired image is displayed on the screen. However, in the screen described in Document 1, a method of controlling the light scattering characteristic, which has an influence on the brightness and the view-angle characteristic, is unclear, and there arises a problem that, for example, the brightness of the image displayed on the liquid crystal display element is low, or the view angle thereof is narrow. Since such a problem arises, the display characteristics of the screen are degraded.

SUMMARY

An advantage of the invention is to provide a screen and an image display system which can exert superior display characteristics (in particular, the brightness and the view angle) than before by controlling the light scattering characteristic.

A screen according to an aspect of the invention includes a polymer-dispersed liquid crystal layer including liquid crystal molecules, and polymer molecules different from the liquid crystal molecules, a twist angle of the polymer molecules is equal to or larger than 180°, and the polymer-dispersed liquid crystal layer comes into a first state of transmitting light entering the polymer-dispersed liquid crystal layer in a period in which an electric field fails to act on the polymer-dispersed liquid crystal layer, and comes into a second state of scattering the light entering the polymer-dispersed liquid crystal layer in a period in which the electric field acts on the polymer-dispersed liquid crystal layer.

According to this aspect of the invention, a screen having superior display characteristics can be provided.

In the screen according to the above aspect of the invention, it is preferable that the polymer-dispersed liquid crystal layer has an isotropic angle distribution of scattering intensity of the light entering the polymer-dispersed liquid crystal layer in the second state.

According to this configuration, there can be exerted the light scattering characteristic, which is bright, and has an even scattering intensity in all angular directions. Therefore, the screen superior in brightness and view angle can be obtained.

In the screen according to the above aspect of the invention, it is preferable that the twist angle of the polymer molecules fulfills a relationship of $180°×n$ (n denotes an integer equal to or greater than 1).

According to this configuration, there can be exerted the light scattering characteristic, which is bright, and has an even scattering intensity in all angular directions. Therefore, the screen superior in brightness and view angle can be obtained.

In the screen according to the above aspect of the invention, it is preferable that the polymer-dispersed liquid crystal layer has an anisotropic angle distribution of scattering intensity of the light entering the polymer-dispersed liquid crystal layer in the second state, and the scattering intensity toward a horizontal direction of the screen is higher than the scattering intensity toward a vertical direction.

According to this configuration, the screen having a horizontally large view angle can be obtained. Such a configuration is suitable for a large screen.

In the screen according to the above aspect of the invention, it is preferable that the twist angle fulfills a relationship of $180°×n+α$ (n denotes an integer equal to or greater than 1, $α$ fulfills $0°<α<180°$), and a predetermined angular direction included in the $α$ coincides with the vertical direction of the screen.

According to this configuration, the screen having a horizontally large view angle can easily be constituted.

In the screen according to the above aspect of the invention, it is preferable that a line segment bisecting an angle of the $α$ coincides with the vertical direction of the screen.

According to this configuration, the horizontal view angle is further increased.

In the screen according to the above aspect of the invention, it is preferable that the polymer-dispersed liquid crystal layer has an anisotropic angle distribution of scattering intensity of the light entering the polymer-dispersed liquid crystal layer in the second state, and the scattering intensity toward a vertical direction of the screen is higher than the scattering intensity toward a horizontal direction.

According to this configuration, the screen having a vertically large view angle can be obtained. Such a configuration is suitable for a small-sized (personal-use) screen.

In the screen according to the above aspect of the invention, it is preferable that the twist angle fulfills a relationship of $180°×n+α$ (n denotes an integer equal to or greater than 1, $α$ fulfills $0°<α<180°$), and a predetermined angular direction included in the $α$ coincides with the horizontal direction of the screen.

According to this configuration, the screen having a vertically large view angle can easily be constituted.

In the screen according to the above aspect of the invention, it is preferable that a line segment bisecting an angle of the $α$ coincides with the horizontal direction.

According to this configuration, the vertical view angle is further increased.

An image display system according to another aspect of the invention includes the screen according to any one of the above configurations, a projector adapted to display an image on the screen, and a control section adapted to control drive of the screen and the projector.

According to this aspect of the invention, an image display system having superior display characteristics can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a screen and an image display system according to the invention will be explained in detail based on some exemplary embodiments shown in the accompanying drawings.

First Embodiment

Figure 1:
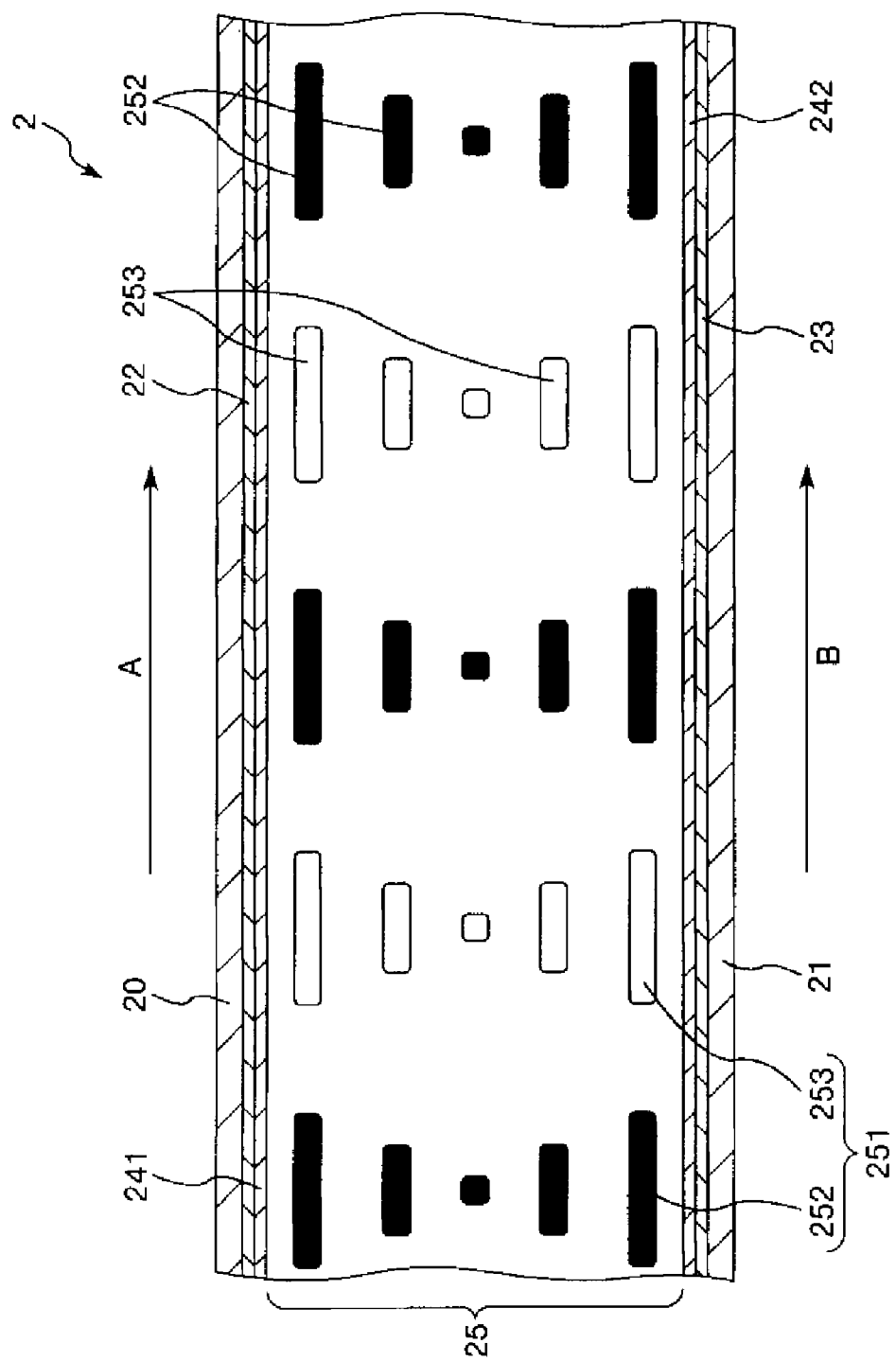
FIG. 1 is a cross-sectional view of a screen according to a first embodiment of the invention.
Figure 2:
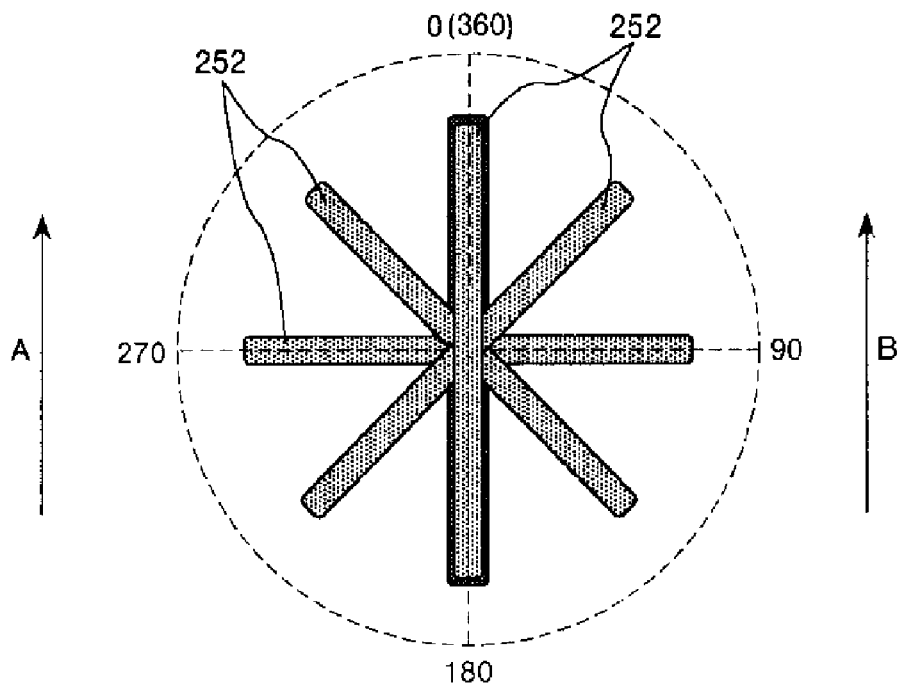
FIG. 2 is a plan view showing a twisted structure of polymer molecules included in the screen shown in FIG. 1.
Figure 3:
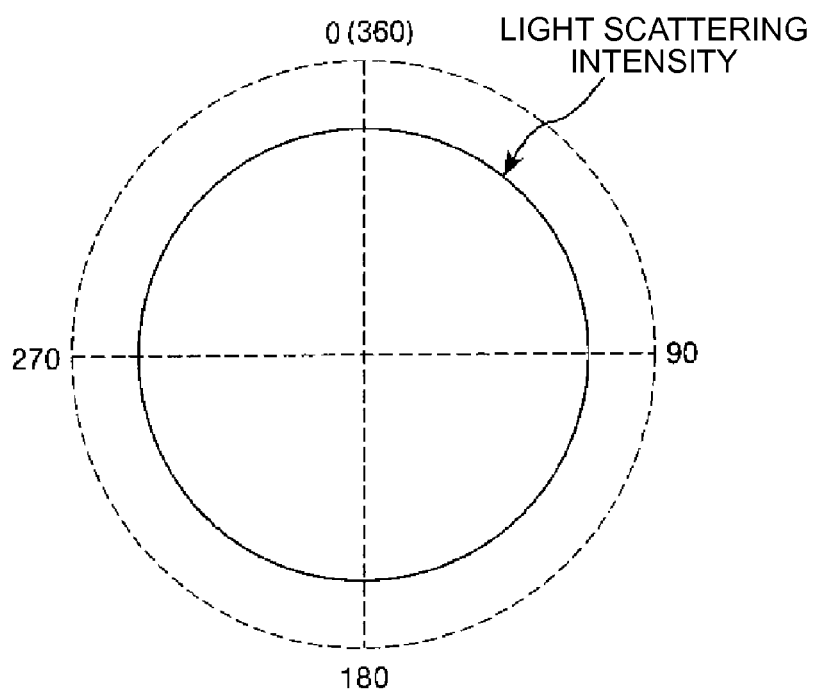
FIG. 3 is a graph showing the light scattering characteristic of the screen shown in FIG. 1.
Figure 4:
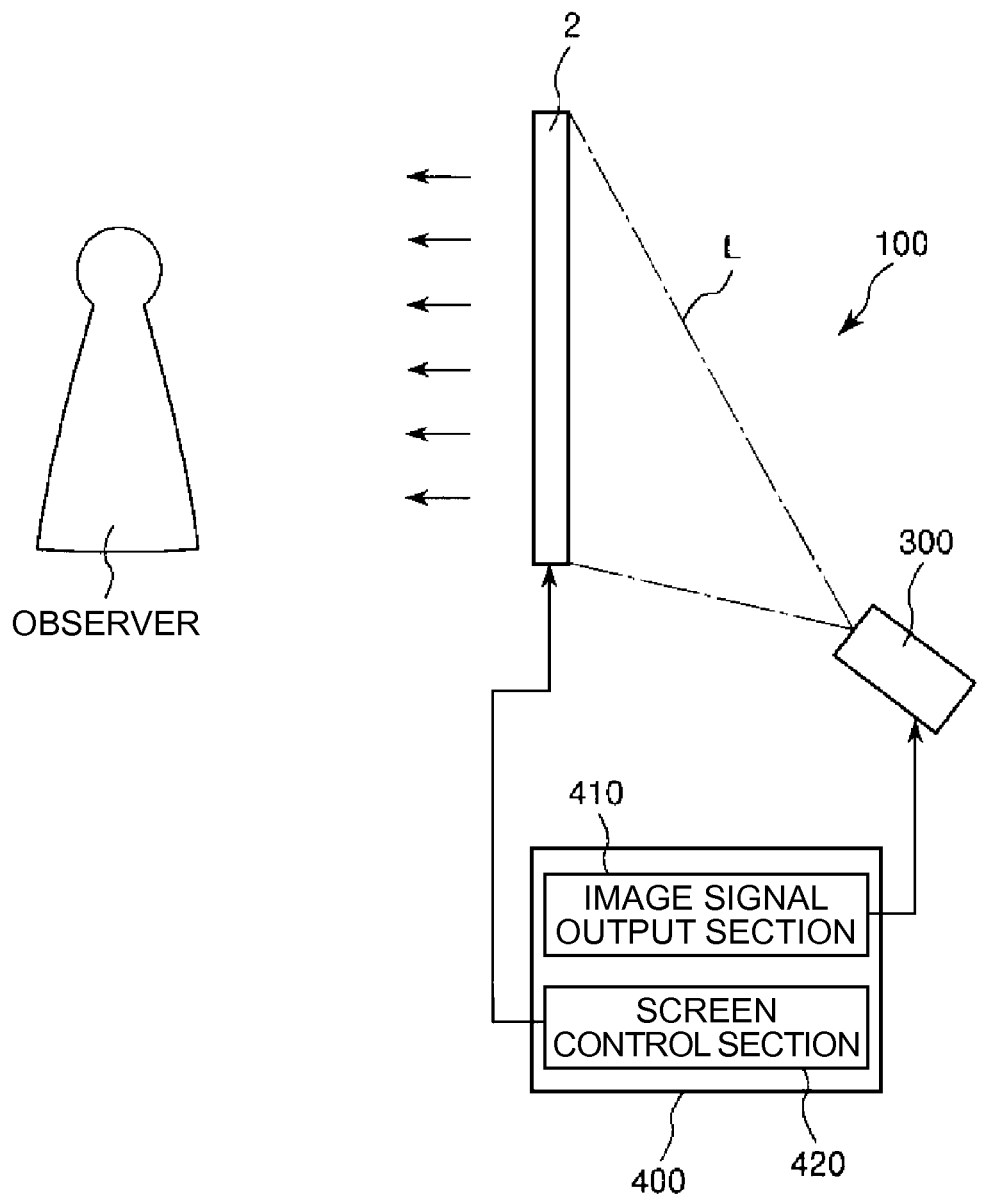
FIG. 4 is a configuration diagram of an image display system to which the screen shown in FIG. 1 is applied.
Figure 5:
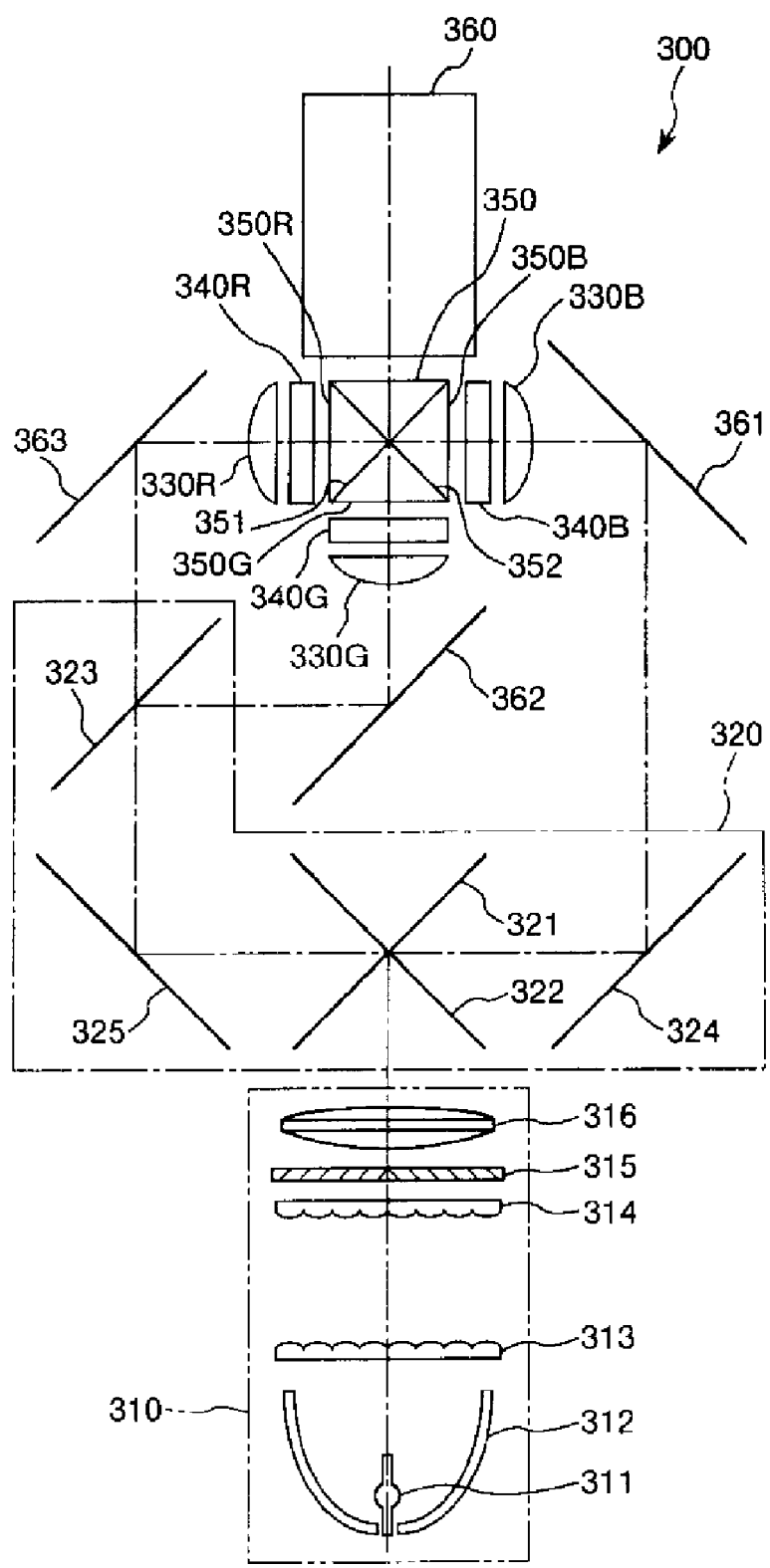
FIG. 5 is a plan view showing a configuration of an optical system of the projector shown in FIG. 4.

FIG. 1 is a cross-sectional view of the screen according to a first embodiment of the invention, FIG. 2 is a plan view showing a twisted structure of polymer molecules included in the screen shown in FIG. 1, FIG. 3 is a graph showing the light scattering characteristic of the screen shown in FIG. 1, FIG. 4 is a configuration diagram of an image display system to which the screen shown in FIG. 1 is applied, and FIG. 5 is a plan view showing an optical system of a projector shown in FIG. 4.

1. Screen

As shown in FIG. 1, the screen 2 has a pair of transparent substrates 20, 21, a pair of transparent electrodes 22, 23, a pair of oriented films 241, 242, a polymer-dispersed liquid crystal layer 25 arranged between the pair of transparent substrates 20, 21 and a sealing section (a sealing member) not shown for sealing the space between the pair of transparent substrates 20, 21. It should be noted that the sealing section also functions as a spacer for forming a gap (a space) for forming a polymer-dispersed liquid crystal layer 25 between the pair of transparent substrates 20, 21.

The transparent substrates 20, 21 have a function of supporting the transparent electrodes 22, 23 and the oriented films 241, 242 described later. The constituent material of such transparent substrates 20, 21 is not particularly limited, and there can be cited, for example, glass such as quartz glass, and a plastic material such as polyethylene terephthalate.

The substrate formed of glass such as quartz glass among these materials is particularly preferable. Thus, there can be obtained the screen 2, in which warpage, deflection, and so on are difficult to be caused, and which is superior in stability.

The transparent electrode 22 out of the pair of transparent electrodes 22, 23 is formed on the lower surface (the surface on the transparent substrate 21 side) of the transparent substrate 20, and the transparent electrode 23 is formed on the upper surface (the surface on the transparent substrate 20 side) of the transparent substrate 21. The transparent electrodes 22, 23 have electrical conductivity, and are formed of, for example, indium tin oxide (ITO), indium oxide (IO), or tin oxide ($SnO_2$).

The oriented film 241 out of the pair of oriented films 241, 242 is formed on the lower surface (the surface on the transparent substrate 21 side) of the transparent electrode 22, and oriented film 242 is formed on the upper surface (the surface on the transparent substrate 20 side) of the transparent electrode 23. The oriented films 241, 242 are each a film obtained by performing an orientation process such as a rubbing process on a film made of, for example, polyimide or polyvinyl alcohol.

The polymer-dispersed liquid crystal layer 25 includes the polymer-dispersed liquid crystal (PDLC) 251. Such a polymer-dispersed liquid crystal layer 25 can be switched between a transmissive (transparent) state (a first state) and a scattering state (a second state) in accordance with the intensity of the applied electric field. The PDLC 251 includes liquid crystal molecules 253 and polymer molecules 252 different from the liquid crystal molecules 253. For example, the PDLC 251 can be formed of a mixture of a macromolecular precursor such as a liquid-crystalline monomer and the liquid crystal molecules. In order to form the PDLC 251, in the state in which the mixture is oriented by the oriented films 241, 242, the mixture is irradiated with an energy beam such as a ultraviolet beam to thereby polymerize the liquid-crystalline monomer. Then, the liquid-crystalline monomer is polymerized while keeping the orientation, and becomes the polymer molecules 252 having anchoring force. The liquid crystal molecules 253 are phase-separated from the polymer molecules 252, and are oriented due to the anchoring force of the polymer molecules 252.

As the macromolecular precursor, those dissolving in the liquid crystal molecules 253, and the mixture of which has liquid crystallinity, and those having a benzene skeleton, preferably a biphenyl backbone, introduced in the polymer molecule, for example, can be cited. Further, even if the benzene skeleton is not provided, the polymer molecules can similarly be used providing the polymer molecules are oriented with the liquid crystal molecules 253. As a specific example of the polymer molecules 252 and the macromolecular precursor, methacrylate ester or acrylic ester of biphenylmethanol or naphthol, or derivatives of these compounds, for example, can be cited. Further, it is also possible to use mixture of any of these compounds and methacrylate ester or acrylic ester derivative of biphenol. Further, as another example, α-methylstyrene, epoxy resin, and so on can also be used. On the other hand, as the liquid crystal molecules 253, any molecules having refractive index anisotropy and dielectric anisotropy can be adopted, and nematic liquid crystal, for example, can be used.

The PDLC 251 of the present embodiment is a so-called "reverse type." Therefore, the polymer-dispersed liquid crystal layer 25 comes into the transmissive state having permeability in the voltage non-application condition (the electric field non-generation condition in which no electric field acts on the polymer-dispersed liquid crystal layer 25) in which no voltage is applied between the pair of transparent electrodes 22, 23, and comes into the scattering state having diffusivity in the voltage application condition (the electric field generation condition in which an electric field acts on the polymer-dispersed liquid crystal layer 25) in which a voltage is applied between the pair of transparent electrodes 22, 23.

In the specific explanation, in the voltage non-application condition, since the liquid crystal molecules 253 are oriented in the same direction as the polymer molecules 252, the refractive indexes are contiguous between the liquid crystal molecules 253 and the polymer molecules 252, and therefore, the light having entered the PDLC 251 is emitted while being hardly diffused, and thus the transmissive state is obtained.

In contrast, in the voltage application condition, the azimuth angle of the liquid crystal molecules 253 varies in accordance with the electric field while the azimuth angle of the polymer molecules 252 does not vary, and therefore, the refractive indexes vary discontinuously between the polymer molecules 252 and the liquid crystal molecules 253 to thereby cause the incident light to be emitted in a scattered manner, and thus the light scattering state is obtained.

It should be noted that the "electric field non-generation condition" includes not only the state in which no electric field acts on the polymer-dispersed liquid crystal layer 25 at all, but also the case in which a voltage lower than the voltage applied in the electric field generation condition is applied between the pair of transparent electrodes 22, 23, and an electric field with lower intensity than in the electric field generation condition is generated.

According to the screen 2 having such a configuration, it is possible to make the screen 2 transparent by setting the screen 2 to the transmissive state in the case in which the screen 2 is not used. Therefore, in the case of, for example, using the screen 2 in the living space, the oppressing feeling caused by the screen 2 can be reduced. Since such a screen 2 has the reverse PDLC 251, it is preferable to use the screen 2 for the purpose having the time (the period of time of the scattering state) during which an image is displayed on the screen 2 shorter than the time (the period of time of the transmissive state) during which no image is displayed on the screen 2. Thus, the power-saving drive of the screen 2 becomes possible.

Hereinabove, the basic configuration of the screen has been explained.

Subsequently, the twist angle of the polymer molecules 252 in the polymer-dispersed liquid crystal layer 25, which is also a feature of the invention, will be explained in detail. In the polymer-dispersed liquid crystal layer 25 provided to the screen 2, the polymer molecules 252 and the liquid crystal molecules 253 are oriented along the orientation direction A of the oriented film 241 on the transparent substrate 20 side, and the polymer molecules 252 and the liquid crystal molecules 253 are oriented along the orientation direction B of the oriented film 242 on the transparent substrate 21 side. In the screen 2, the orientation directions of the oriented films 241, 242 are different from each other, and there is formed a twisted structure in which the orientation direction of the polymer molecules 252 and the liquid crystal molecules 253 rotates clockwise along the direction from the transparent substrate 20 side to the transparent substrate 21 side, and which has a predetermined twist angle. It should be noted that the rotational direction of the orientation direction is not particularly limited, and the orientation direction can also be rotated counterclockwise.

A feature of the screen according to the embodiment of the invention resides in that the twist angle $\theta$ of the polymer molecules in the polymer-dispersed liquid crystal layer is equal to or larger than 180°. Since such a feature is provided, the screen capable of exerting superior display characteristics can be obtained as described later.

In particular, in the screen 2 according to the present embodiment, the twist angle $\theta$ of the polymer molecules 252 in the polymer-dispersed liquid crystal layer 25 is set to an integral multiple (excluding 0 times) of 180°. In other words, the twist angle $\theta$ is set so as to fulfill the expression of 180°×n (n denotes an integer equal to or greater than 1). By adopting such a twist angle $\theta$, it is possible to realize a screen, which is bright, and has an even view angle in all angular directions. Hereinafter, the reason will be explained in detail.

The polymer molecules 252 in the polymer-dispersed liquid crystal layer 25 are oriented along the orientation direction A of the oriented film 241 on the transparent substrate 20. Therefore, it results that in the case in which the screen 2 is in the scattering state, the polymer molecules 252 exert a similar function to that of the diffraction grating in the same direction as the orientation axis (the orientation direction A) thereof on the transparent substrate 20 side, and exhibit a more intensive scattering property in the direction perpendicular to the orientation direction A in a plan view of the screen 2. Since such polymer molecules 252 form the twisted structure having the twist angle of 180°, the direction exhibiting the intensive scattering property also rotates toward the transparent substrate 21 side so as to correspond to the twist.

Here, FIG. 2 is a schematic diagram of the polymer molecules 252 viewed from the transparent substrate 20 side, and FIG. 3 is a graph showing the light scattering characteristic (the angular distributions of the light scattering intensity) of the screen 2. It should be noted that the light scattering characteristic shown in the graph of FIG. 3 is based on the data obtained by irradiating the surface of the transparent substrate 20 with a parallel beam (visible light) from a normal direction with respect to the surface of the transparent substrate 20, and measuring the scattered light at the position on the normal line above the transparent substrate 20. The numerical values 0, 90, 180, 270 described outside the graph show the azimuth angle $\phi$ of the incident light, and the relationship between the azimuth angle and the light scattering characteristic directly represents the view angle characteristic of the screen 2.

As shown in FIG. 2, if the twist angle of the polymer molecules 252 is 180°, it results that the orientation axes of the polymer molecules 252 exist evenly in all angular directions from the twist center O of the polymer molecules 252. Therefore, as shown in FIG. 3, it is possible to exhibit even and high scattering intensity in all angular directions from the twist center O. In other words, it is possible to exhibit an intensive light distribution without the view angle dependency with respect to all angular directions, and there can be obtained the screen 2, which is bright, and provides a wide view angle in all angular directions. As described above, by controlling the light scattering characteristic of the screen 2, the superior display characteristics can be exerted.

It should be noted that the twist angle $\theta$ of the polymer molecules 252 is only required to fulfill the relationship of 180°×n as described above, and can also be 360°, 540°, 720°, 900°, and so on besides 180°. However, on the ground that, for example, the anchoring force increases as the twist angle $\theta$ increases, the level of the voltage applied between the transparent electrodes 22, 23 for making the scattering state is increased. In other words, the power consumption increases as the twist angle $\theta$ increases. Therefore, from the viewpoint of the power-saving drive, the twist angle $\theta$ is preferably 180° or 360°, and is more preferably 180°.

2. Image Display System

Then, an image display system 100 to which the screen 2 is applied will be explained.

As shown in FIG. 4, the image display system 100 has the screen 2, a projector 300 for displaying an image on the screen 2, and a control section 400 for controlling drive of the screen 2 and the projector 300. In such an image display system 100, the image is projected on the back surface (the opposite surface to the observer) of the screen 2 from the opposite side of the screen 2 to the observer. It should be noted that it is also possible to project the image on the front surface (the surface on the observer side) of the screen 2 from the observer side of the screen 2.

The projector 300 is not particularly limited providing it can display an image on the screen 2, an illumination projection projector for projecting an image formed in a spatial light modulation device on the screen 2 in an enlarged manner, and a scanning projector for forming an image by scanning the screen 2 with light can also be adopted. An example of the projector 300 will hereinafter be described.

FIG. 5 is a plan view showing a configuration of an optical system of the projector 300. As shown in FIG. 5, the projector 300 is provided with an illumination optical system 310, a color separation optical system 320, collimating lenses 330R, 330G, and 330B, spatial light modulation devices 340R, 340G, and 340B, and a cross dichroic prism 350 as a light combining section. The illumination optical system 310 has a light source 311, a reflector 312, a first lens array 313, a second lens array 314, a polarization conversion element 315, and an overlapping lens 316.

The light source 311 is a super-high pressure mercury lamp, and the reflector 312 is configured including a parabolic mirror. A radial light beam emitted from the light source 311 is reflected by the reflector 312 to be a substantially parallel light beam, and then emitted to the first lens array 313. It should be noted that the light source 311 is not limited to the super-high pressure mercury lamp, and a metal halide lamp, for example, can also be adopted. Further, the reflector 312 is not limited to the parabolic mirror, and it is possible to adopt a configuration of disposing a collimating concave lens on an exit surface of the reflector formed of an ellipsoidal mirror.

The first lens array 313 and the second lens array 314 are each composed of small lenses arranged in a matrix. The light beam emitted from the light source 311 is divided by the first lens array 313 into a plurality of microscopic partial light beams, and the partial light beams overlap on the surfaces of the three spatial light modulation devices 340R, 340G, and 340B as illumination objects due to the second lens array 314 and the overlapping lens 316.

The polarization conversion element 315 has a function of aligning the light beam with random polarization to linearly polarized light (S-polarized light or P-polarized light) vibrating in one direction, and in the present embodiment, aligns it to the S-polarized light, which has a smaller loss of the light beam in the color separation optical system 320.

The color separation optical system 320 has a function of separating the light beam (the S-polarized light) emitted from the illumination optical system 310 into colored lights corresponding to three colors, namely red (R) light, green (G) light, and blue (B) light, and is provided with a B light reflecting dichroic mirror 321, an RG light reflecting dichroic mirror 322, a G light reflecting dichroic mirror 323, and reflecting mirrors 324, 325.

The component of the B light in the light beam emitted from the illumination optical system 310 is reflected by the B light reflecting dichroic mirror 321, then further reflected by the reflecting mirrors 324, 361, and then reaches the collimating lens 330B. On the other hand, the components of the G light and the R light in the light beam emitted from the illumination optical system 310 are reflected by the RG light reflecting dichroic mirror 322, then further reflected by the reflecting mirror 325, and then reaches the G light reflecting dichroic mirror 323. The component of the G light among these components reflected by the G light reflecting dichroic mirror 323 and the reflecting mirror 362, and then reaches the collimating lens 330G, and the component of the R light is transmitted through the G light reflecting dichroic mirror 323, then is reflected by the reflecting mirror 363, and then reaches the collimating lens 330R.

The collimating lenses 330R, 330G, and 330B are set so that each of the plurality of partial light beams from the illumination optical system 310 becomes a substantially collimated light beam illuminating each of the spatial light modulation devices 340R, 340G, and 340B.

The R light transmitted through the collimating lens 330R reaches the spatial light modulation device 340R, the G light transmitted through the collimating lens 330G reaches the spatial light modulation device 340G, and the B light transmitted through the collimating lens 330B reaches the spatial light modulation device 340B.

The spatial light modulation device 340R is a spatial light modulation device for modulating the R light in accordance with an image signal, and is a transmissive liquid crystal display device. A liquid crystal panel not shown provided to the spatial light modulation device 340R has a liquid crystal layer for modulating the light in accordance with the image signal encapsulated between a pair of transparent substrates. The R light modulated by the spatial light modulation device 340R enters the cross dichroic prism 350 as a color combining optical system. It should be noted that the configurations and the functions of the spatial light modulation devices 340G, 340B are the same as those of the spatial light modulation device 340R.

The cross dichroic prism 350 is formed to have a prismatic shape with a roughly square cross-section by bonding four triangular prisms to each other, and dielectric multilayer films 351, 352 are disposed along the bonding surfaces having an X shape. The dielectric multilayer film 351 transmits the G light while reflecting the R light, and the dielectric multilayer film 352 transmits the G light while reflecting the B light. Further, the cross dichroic prism 350 inputs the modulated lights of the respective colors emitted from the spatial light modulation devices 340R, 340G, and 340B through entrance surfaces 350R, 350G, and 350B and then combines them with each other to thereby form the image light representing a color image, and then emits it to the projection optical system 360.

Thus, the picture light L as the linearly polarized light is emitted from the projector 300.

As shown in FIG. 4, the control section 400 has an image signal output section 410 for outputting the image signal to the projector 300, and a screen control section 420 for controlling drive (ON/OFF) of the screen 2. When receiving the image signal from the signal output section 410, the projector 300 emits the picture light L based on the image signal.

Such a control section 400 is configured so as to control drive of the screen 2 with the screen control section 420 in accordance with the output of the image signal from the image signal output section 410 to the projector 300. Specifically, the control section 400 sets the screen 2 to the transmissive (transparent) state with the screen control section 420 in the condition of not outputting the image signal from the image signal output section 410. In contrast, the control section 400 sets the screen 2 to the scattering state with the screen control section 420 in the condition of outputting the image signal from the image signal output section 410.

According to such control, it is possible to set the screen 2 to the transmissive state in the case in which the picture light L is not output from the projector 300, namely in the case in which an image to be displayed on the screen 2 is not present. Further, in the case in which the picture light L is emitted from the projector 300, the screen 2 can be set to the scattering state to thereby display the image corresponding to the picture light L on the screen 2. Therefore, it is possible to make the screen 2 transparent with the simple control except the case in which an image is displayed on the screen 2, and thus, the power saving can be achieved, and at the same time, the oppressive feeling provided to the living space can be reduced.

Second Embodiment

Then, a screen according to a second embodiment of the invention will be explained.

Figure 6:
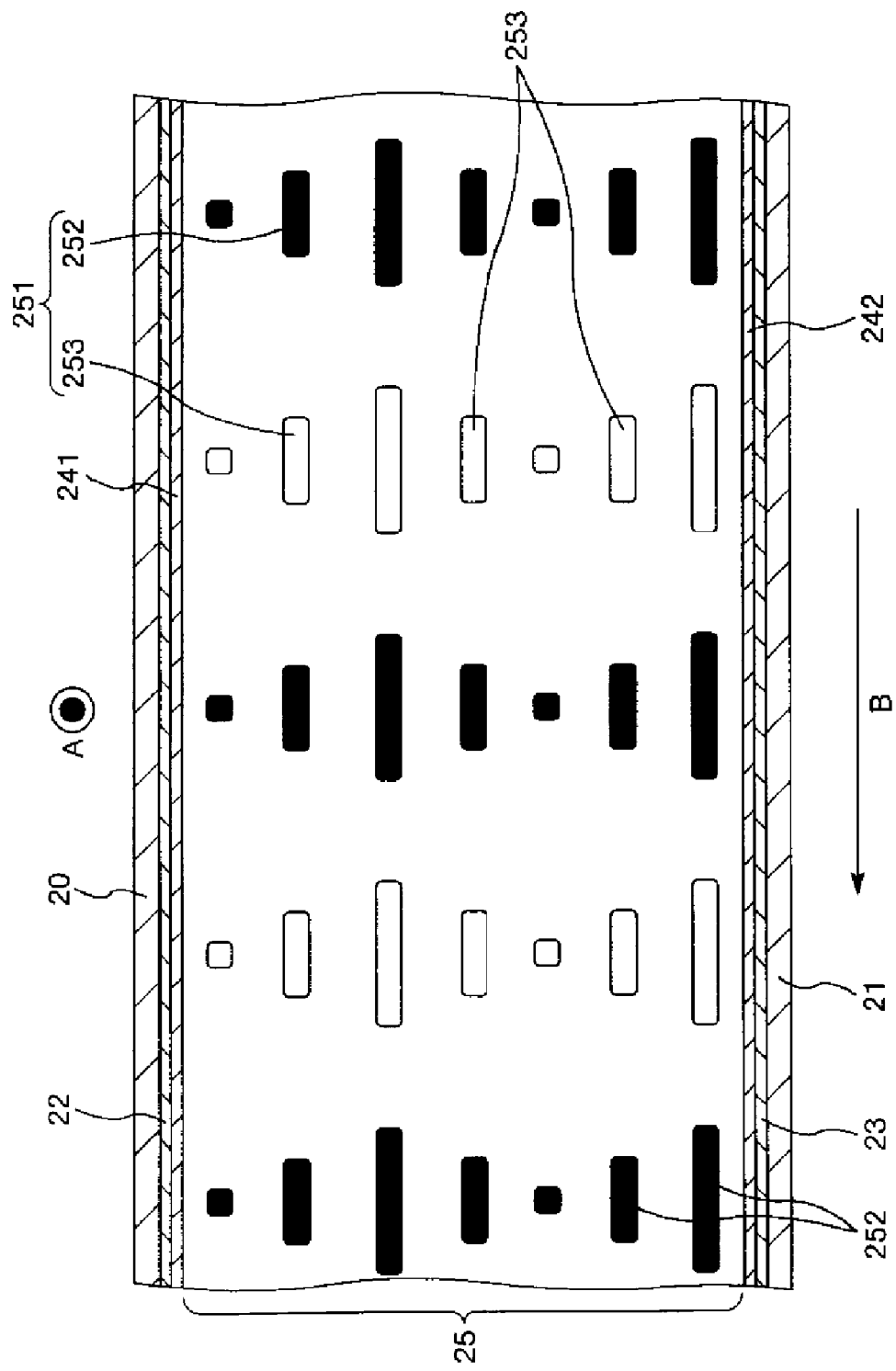
FIG. 6 is a cross-sectional view of a screen according to a second embodiment of the invention.
Figure 7:
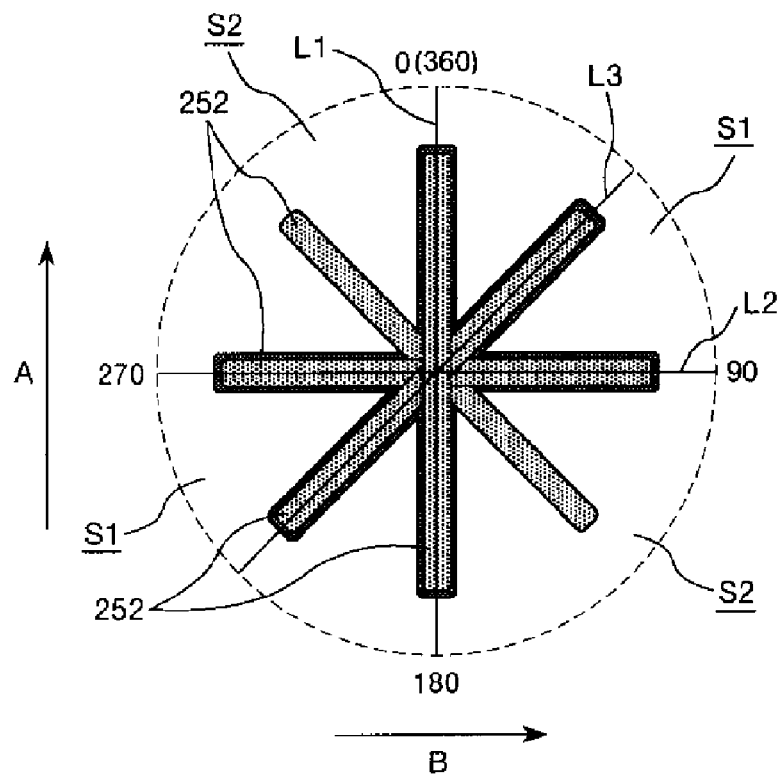
FIG. 7 is a plan view showing a twisted structure of polymer molecules included in the screen shown in FIG. 6.
Figure 8:
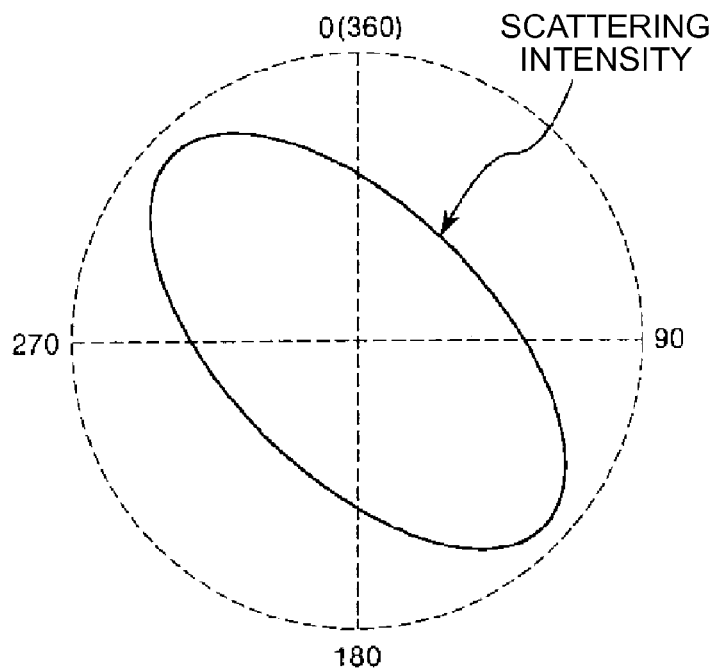
FIG. 8 is a graph showing the light scattering characteristic of the screen shown in FIG. 6.
Figure 9:
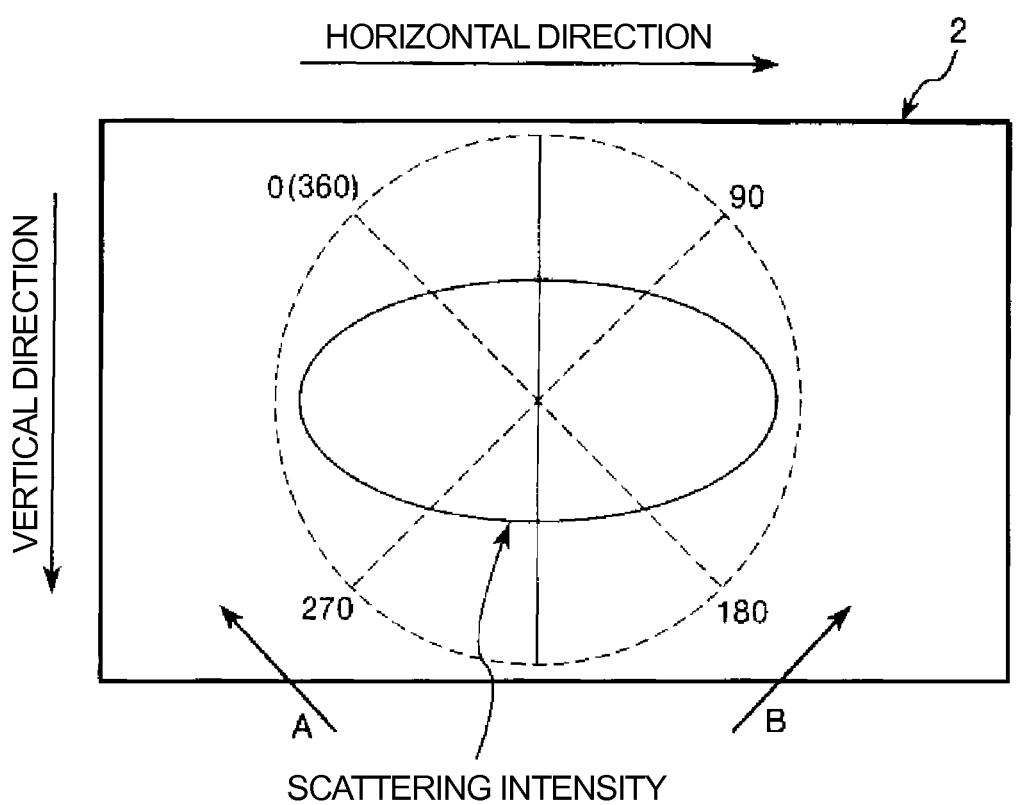
FIG. 9 is a plan view showing a relationship between the vertical and horizontal directions of the screen shown in FIG. 6, the orientation direction of the polymer molecules, and the light scattering characteristic.

FIG. 6 is a cross-sectional view of the screen according to the second embodiment of the invention, FIG. 7 is a plan view showing a twisted structure of polymer molecules included in the screen shown in FIG. 6, FIG. 8 is a graph showing the light scattering characteristic of the screen shown in FIG. 6, and FIG. 9 is a plan view showing a relationship between vertical and horizontal directions of the screen shown in FIG. 6, the orientation direction of the polymer molecules, and the light scattering characteristic.

Hereinafter, the screen according to the second embodiment will be described with a focus mainly on the differences from the embodiment described above, and the explanations regarding substantially the same matters will be omitted.

The screen according to the second embodiment of the invention is substantially the same as the screen according to the first embodiment described above except the point that the twist angle of the polymer molecules is different. It should be noted that the constituents identical to those of the first embodiment described above are denoted by the same reference symbols.

The polymer-dispersed liquid crystal layer provided to the screen 2 according to the present embodiment has anisotropy in light scattering intensity (the angle distribution of the light scattering intensity has anisotropy) in the plan view thereof, and the light scattering intensity toward the horizontal direction of the screen 2 is higher than the light scattering intensity toward the vertical direction thereof. Thus, it is possible to make the brightness and the view angle in the horizontal direction of the screen 2 higher (larger), and it becomes possible to observe the bright image displayed on the screen 2 from a broader range in the horizontal direction of the screen 2. Therefore, the screen 2 according to the present embodiment can preferably be used as a screen for letting many people located at different positions observe the image at the same time such as a large screen installed in a street corner or a store. Hereinafter, the screen 2 according to the present embodiment will be described in detail.

In the screen 2 according to the present embodiment, the orientation direction of the polymer molecules 252 and the liquid crystal molecules 253 rotates clockwise along the direction from the transparent substrate 20 side to the transparent substrate 21 side. It should be noted that the rotational direction of the orientation direction is not particularly limited, and the orientation direction can also be rotated counterclockwise.

Further, the twist angle θ of the polymer molecules 252 is larger than 180°, and is an angle other than 180°×n (n denotes an integer equal to or greater than 1). In other wards, the twist angle θ of the polymer molecules 252 fulfills the relationship of 180°×n+α (0°<α<180° is fulfilled). As such a twist angle θ, there can be cited, for example, 270°, 450°, 630°, but from the viewpoint of the power-saving drive, the smaller twist angle θ is more preferable, and preferably fulfills the range of 180°<θ≤270°.

As shown in FIG. 6, in the screen 2 according to the present embodiment, the twist angle θ of the polymer molecules 252 is set to 270°. Thus, similarly to the first embodiment described above, the high scattering intensity can be exhibited in all angular directions. In addition, the following advantages can be obtained.

As shown in FIG. 7, in first regions S1 with the azimuth angle equal to or larger than 0° and equal to or smaller than 90°, or equal to or larger than 180° and equal to or smaller than 270°, a plurality of polymer molecules 252 overlap each other in the thickness direction with the same orientation directions (orientation axes) in the plan view of the screen 2. In contrast, in second regions S2 with the azimuth angle larger than 90° and smaller than 180°, or larger than 270° and smaller than 360°, the polymer molecules 252 do not overlap each other. In such a state, since the first region S1 scatters the light more intensively than the second region S2, the light scattering intensity toward the direction perpendicular to the first regions S1 is higher than the light scattering intensity toward the direction perpendicular to the second regions S2.

Therefore, the screen 2 according to the present embodiment has the light scattering intensity with anisotropy as shown in FIG. 8.

Therefore, in order to set the brightness and the view angle in the horizontal direction of the screen 2 to be higher, it is possible to define the orientation directions A, B of the oriented films 241, 242 so that the first regions S1, which are the regions with higher light scattering intensity, are arranged along the vertical direction of the screen 2 as shown in FIG. 9. Specifically, it is possible to define the orientation directions A, B of the oriented films 241, 242 so that a predetermined angular direction included in the angle range α, more specifically, either one of a line segment L1 connecting the azimuth angles 0°, 180° corresponding respectively to one ends of the first regions S1, a line segment L2 connecting the azimuth angles 90°, 270° corresponding respectively to the other ends of the first regions S1, and a lot of line segments L3 existing between the line segments L1 and L2 is aligned in the vertical direction of the screen 2. Thus, there can be obtained the screen 2 in which the light scattering intensity toward the horizontal direction is higher than the light scattering intensity toward the vertical direction, and the brightness and the view angle in the horizontal direction are higher.

As a more preferable arrangement, there can be cited an arrangement in which the line segment L3 (the light segment bisecting the angle range α) connecting the azimuth angles 45°, 135°, the central values (the middle values) of the azimuth angles included in the respective first regions S1, is aligned in the vertical direction of the screen 2. Thus, it is possible to further increase the brightness and the view angle in the horizontal direction of the screen 2.

Third Embodiment

Then, a screen according to a third embodiment of the invention will be explained.

Figure 10:
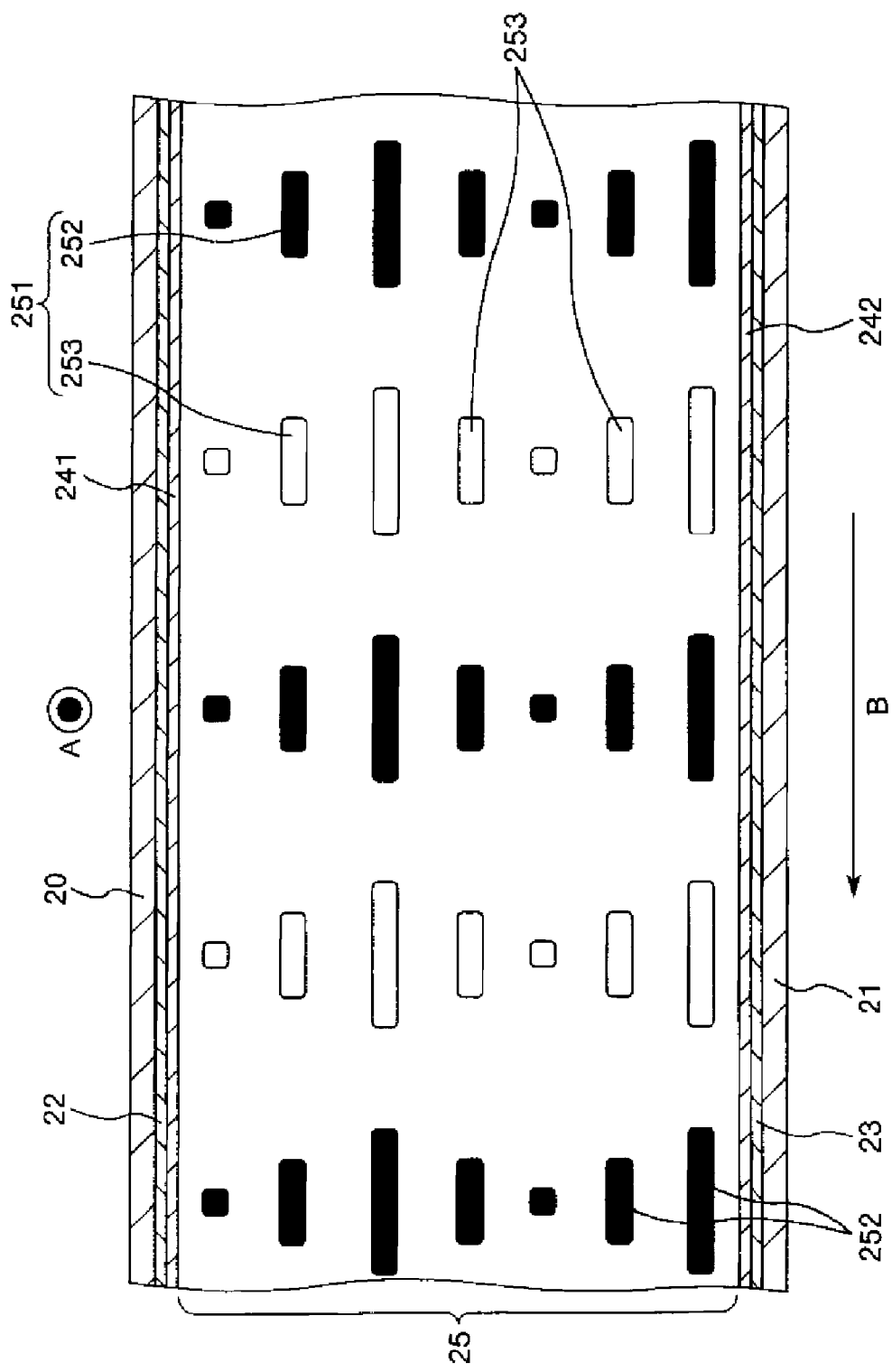
FIG. 10 is a cross-sectional view of a screen according to a third embodiment of the invention.
Figure 11:
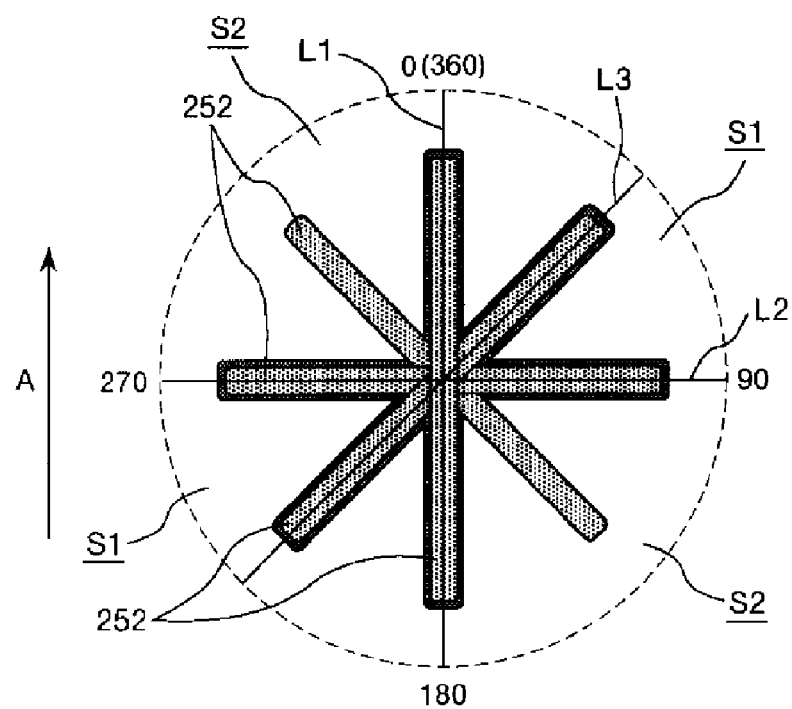
FIG. 11 is a plan view showing a twisted structure of polymer molecules included in the screen shown in FIG. 10.
Figure 12:
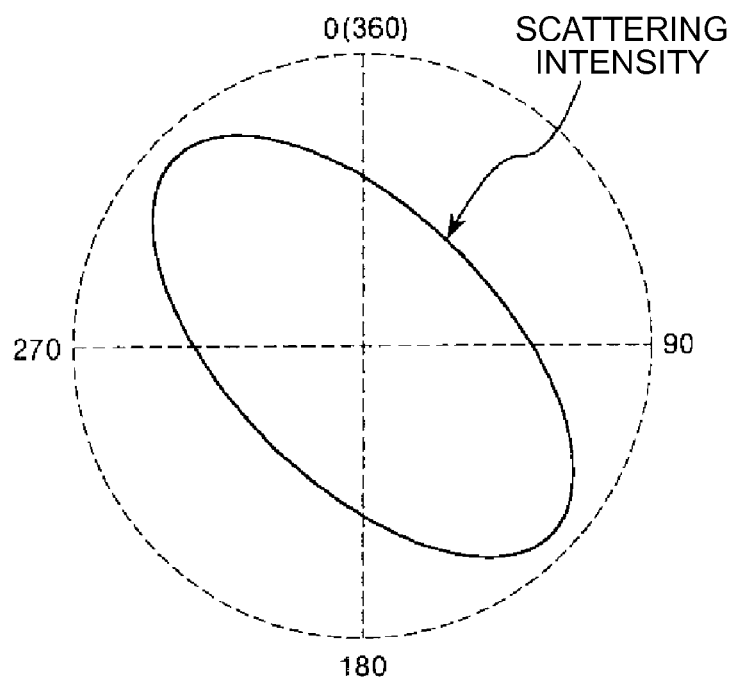
FIG. 12 is a graph showing the light scattering characteristic of the screen shown in FIG. 10.
Figure 13:
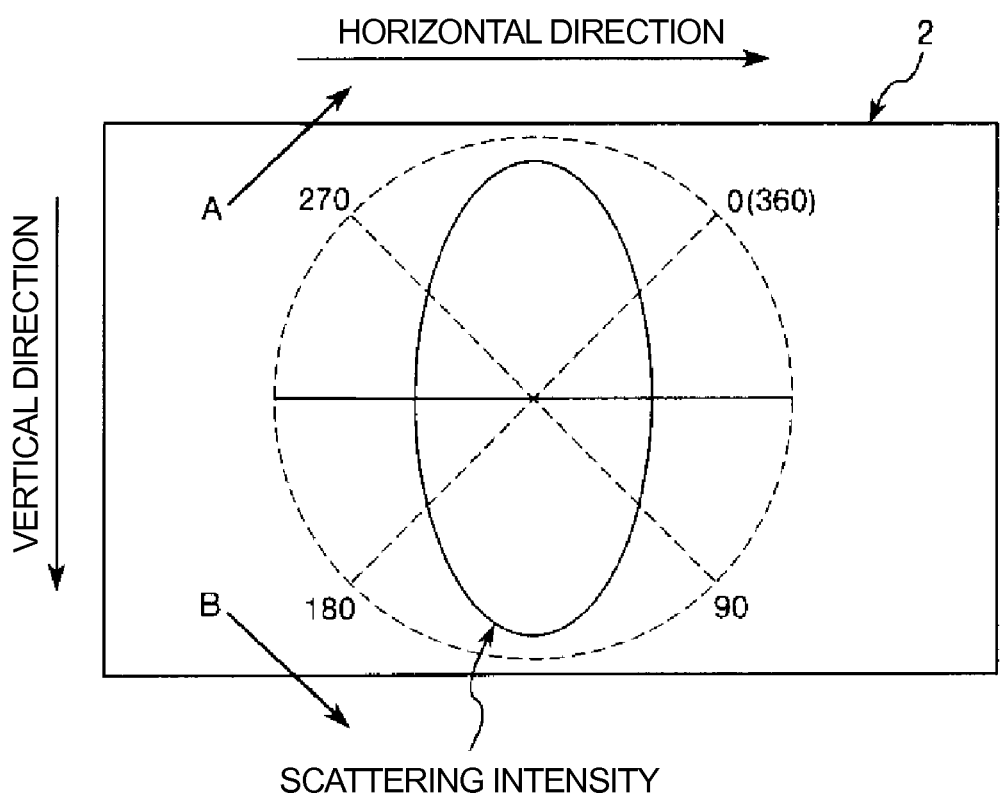
FIG. 13 is a plan view showing a relationship between the vertical and horizontal directions of the screen shown in FIG. 10, the orientation direction of the polymer molecules, and the light scattering characteristic.

FIG. 10 is a cross-sectional view of the screen according to the third embodiment of the invention, FIG. 11 is a plan view showing a twisted structure of polymer molecules included in the screen shown in FIG. 10, FIG. 12 is a graph showing the light scattering characteristic of the screen shown in FIG. 10, and FIG. 13 is a plan view showing a relationship between vertical and horizontal directions of the screen shown in FIG. 10, the orientation direction of the polymer molecules, and the light scattering characteristic.

Hereinafter, the screen according to the third embodiment will be described with a focus mainly on the differences from the embodiment described above, and the explanations regarding substantially the same matters will be omitted.

The screen according to the third embodiment of the invention is substantially the same as the screen according to the second embodiment described above except the point that the orientation directions of the oriented films are different. It should be noted that the constituents identical to those of the second embodiment described above are denoted by the same reference symbols.

The polymer-dispersed liquid crystal layer provided to the screen 2 according to the present embodiment has anisotropy in light scattering intensity (the angle distribution of the light scattering intensity has anisotropy) in the plan view thereof, and the light scattering intensity toward the vertical direction of the screen 2 is higher than the light scattering intensity toward the horizontal direction thereof. Thus, it is possible to make the brightness and the view angle in the vertical direction of the screen 2 higher (larger), and it becomes possible to observe the bright image displayed on the screen 2 from a broader range in the vertical direction of the screen 2. Therefore, the screen 2 according to the present embodiment can preferably be used as a personal-use screen, which is relatively small in size, and is viewed personally, such as a photo frame or a monitor display for a personal computer. In such a personal-use screen 2, since a single observer usually observes an image displayed on the screen 2 from the front, the view angle in the horizontal direction is not important. In contrast, since the screen 2 and the position of the face (the eyes) of the observer are shifted from each other in the vertical direction due to the height or the posture (sitting or standing) of the observer, it is important that the view angle in the vertical direction is large. Hereinafter, the screen 2 according to the present embodiment will be described in detail.

In the screen 2 according to the present embodiment, the orientation direction of the polymer molecules 252 and the liquid crystal molecules 253 rotates clockwise along the direction from the transparent substrate 20 side to the transparent substrate 21 side. It should be noted that the rotational direction of the orientation direction is not particularly limited, and the orientation direction can also be rotated counterclockwise.

Further, the twist angle θ of the polymer molecules 252 is larger than 180°, and is an angle other than 180°×n (n denotes an integer equal to or greater than 1). In other wards, the twist angle θ of the polymer molecules 252 fulfills the relationship of 180°×n+α (0°<α<180° is fulfilled). As such a twist angle θ, there can be cited, for example, 270°, 450°, 630°, but from the viewpoint of the power-saving drive, the smaller twist angle θ is more preferable, and preferably fulfills the range of 180°<θ≤270°.

As shown in FIG. 10, in the screen 2 according to the present embodiment, the twist angle θ of the polymer molecules 252 is set to 270°. Thus, similarly to the first embodiment described above, the high scattering intensity can be exhibited in all angular directions. In addition, the following advantages can be obtained.

As shown in FIG. 11, in first regions S1 with the azimuth angle equal to or larger than 0° and equal to or smaller than 90°, or equal to or larger than 180° and equal to or smaller than 270°, a plurality of polymer molecules 252 overlap each other in the thickness direction with the same orientation directions (orientation axes) in the plan view of the screen 2. In contrast, in second regions S2 with the azimuth angle larger than 90° and smaller than 180°, or larger than 270° and smaller than 360°, the polymer molecules 252 do not overlap each other. In such a state, since the first region S1 scatters the light more intensively than the second region S2, the light scattering intensity toward the direction perpendicular to the first regions S1 is higher than the light scattering intensity toward the direction perpendicular to the second regions S2.

Therefore, the screen 2 according to the present embodiment has the light scattering intensity with anisotropy as shown in FIG. 12.

Therefore, in order to set the brightness and the view angle in the vertical direction of the screen 2 to be higher, it is possible to define the orientation directions A, B of the oriented films 241, 242 so that the first regions S1, which are the regions with higher light scattering intensity, are arranged along the horizontal direction of the screen 2 as shown in FIG. 13. Specifically, it is possible to define the orientation directions A, B of the oriented films 241, 242 so that a predetermined angular direction included in the angle range α, more specifically, either one of a line segment L1 connecting the azimuth angles 0°, 180° corresponding respectively to one ends of the first regions S1, a line segment L2 connecting the azimuth angles 90°, 270° corresponding respectively to the other ends of the first regions S1, and a lot of line segments L3 existing between the line segments L1 and L2 is aligned in the horizontal direction of the screen 2. Thus, there can be obtained the screen 2 in which the light scattering intensity toward the vertical direction is higher than the light scattering intensity toward the horizontal direction, and the brightness and the view angle in the vertical direction are higher.

As a more preferable arrangement, there can be cited an arrangement in which the line segment L3 (the light segment bisecting the angle range α) connecting the azimuth angles 45°, 135°, the central values (the middle values) of the azimuth angles included in the respective first regions S1, is aligned in the horizontal direction of the screen 2. Thus, it is possible to further increase the brightness and the view angle in the vertical direction of the screen 2.

Although the screen and the image display system according to the invention are hereinabove described based on the embodiments shown in the accompanying drawings, the invention is not limited thereto, but the configuration of each of the constituents can be replaced with one having an arbitrary configuration with an equivalent function. Further, it is possible to add any other constituents to the invention. Further, it is also possible to arbitrarily combine any of the embodiments.

The entire disclosure of Japanese Patent Application No. 2011-222914, filed Oct. 7, 2011 is expressly incorporated by reference herein.

What is claimed is:

1. A screen comprising:
a polymer-dispersed liquid crystal layer including
liquid crystal molecules, and
polymer molecules different from the liquid crystal molecules,
wherein a twist angle of the polymer molecules is equal to or larger than 180°, and
the polymer-dispersed liquid crystal layer
comes into a first state of transmitting light entering the polymer-dispersed liquid crystal layer in a period in which an electric field fails to act on the polymer-dispersed liquid crystal layer, and
comes into a second state of scattering the light entering the polymer-dispersed liquid crystal layer in a period in which the electric field acts on the polymer-dispersed liquid crystal layer.

2. The screen according to claim 1, wherein
the polymer-dispersed liquid crystal layer has an isotropic angle distribution of scattering intensity of the light entering the polymer-dispersed liquid crystal layer in the second state.

3. The screen according to claim 2, wherein
the twist angle of the polymer molecules fulfills a relationship of 180°×n (n denotes an integer equal to or greater than 1).

4. An image display system comprising:
the screen according to claim 3;
a projector adapted to display an image on the screen; and
a control section adapted to control drive of the screen and the projector.

5. An image display system comprising:
the screen according to claim 2;
a projector adapted to display an image on the screen; and
a control section adapted to control drive of the screen and the projector.

6. The screen according to claim 1, wherein
the polymer-dispersed liquid crystal layer has an anisotropic angle distribution of scattering intensity of the light entering the polymer-dispersed liquid crystal layer in the second state, and
the scattering intensity toward a horizontal direction of the screen is higher than the scattering intensity toward a vertical direction.

7. The screen according to claim 6, wherein
the twist angle fulfills a relationship of 180°×n+α (n denotes an integer equal to or greater than 1, α fulfills 0°<α<180°), and
a predetermined angular direction included in the α coincides with the vertical direction of the screen.

8. The screen according to claim 7, wherein
a line segment bisecting an angle of the α coincides with the vertical direction of the screen.

9. An image display system comprising:
the screen according to claim 8;
a projector adapted to display an image on the screen; and
a control section adapted to control drive of the screen and the projector.

10. An image display system comprising:
the screen according to claim 6;
a projector adapted to display an image on the screen; and
a control section adapted to control drive of the screen and the projector.

11. An image display system comprising:
the screen according to claim 7;
a projector adapted to display an image on the screen; and
a control section adapted to control drive of the screen and the projector.

12. The screen according to claim 1, wherein
the polymer-dispersed liquid crystal layer has an anisotropic angle distribution of scattering intensity of the light entering the polymer-dispersed liquid crystal layer in the second state, and
the scattering intensity toward a vertical direction of the screen is higher than the scattering intensity toward a horizontal direction.

13. The screen according to claim 12, wherein
the twist angle fulfills a relationship of 180°×n+α (n denotes an integer equal to or greater than 1, α fulfills 0°<α<180°), and
a predetermined angular direction included in the α coincides with the horizontal direction of the screen.

14. The screen according to claim 13, wherein
a line segment bisecting an angle of the α coincides with the horizontal direction.

15. An image display system comprising:
the screen according to claim 14;
a projector adapted to display an image on the screen; and
a control section adapted to control drive of the screen and the projector.

16. An image display system comprising:
the screen according to claim 12;
a projector adapted to display an image on the screen; and
a control section adapted to control drive of the screen and the projector.

17. An image display system comprising:
the screen according to claim 13;
a projector adapted to display an image on the screen; and
a control section adapted to control drive of the screen and the projector.

18. An image display system comprising:
the screen according to claim 1;
a projector adapted to display an image on the screen; and
a control section adapted to control drive of the screen and the projector.

* * * * *